US006513887B2

(12) United States Patent
Paczkowski et al.

(10) Patent No.: US 6,513,887 B2
(45) Date of Patent: Feb. 4, 2003

(54) SPRING CLIP RETAINER FOR VENDING MACHINE STORAGE COMPARTMENTS

(75) Inventors: Thomas S. Paczkowski, Wildwood, MO (US); John E. Dundon, St. Louis, MO (US)

(73) Assignee: Coin Acceptors, Inc., St. Louis, MO (US)

( * ) Notice: Subject to any disclaimer, the term of this patent is extended or adjusted under 35 U.S.C. 154(b) by 21 days.

(21) Appl. No.: 09/755,377

(22) Filed: Jan. 5, 2001

(65) Prior Publication Data

US 2002/0089267 A1 Jul. 11, 2002

(51) Int. Cl.[7] .......... B65G 59/00
(52) U.S. Cl. .......... 312/45; 221/67
(58) Field of Search .......... 312/35, 36, 42, 312/45, 72, 116; 221/67, 114; 211/49.1, 59.1, 59.2

(56) References Cited

U.S. PATENT DOCUMENTS 1,163,868 A * 12/1915 Sherer .......... 312/351 X
2,836,326 A 5/1958 Childers .......... 221/67
3,026,002 A 3/1962 Torres .......... 221/67
3,158,247 A * 11/1964 Gale .......... 221/116 X
3,263,856 A * 8/1966 Gasparini .......... 221/67
4,460,107 A 7/1984 Lindsey .......... 221/67
4,940,161 A 7/1990 Hieb .......... 221/67
4,986,615 A 1/1991 Hieb et al. .......... 312/45
4,991,739 A 2/1991 Levasseur .......... 221/114
4,991,740 A 2/1991 Levasseur .......... 221/114
5,529,207 A 6/1996 Oden et al. .......... 221/67
6,302,293 B1 * 10/2001 Wittern, Jr. et al. .......... 221/92

FOREIGN PATENT DOCUMENTS

CA 827507 * 11/1969 .......... 312/42

* cited by examiner

*Primary Examiner*—James O. Hansen
(74) *Attorney, Agent, or Firm*—Polster, Lieder, Woodruff & Lucchesi, L.C.

(57) ABSTRACT

This retainer system for a vending machine compartment includes a retainer having an upper hook wall connection which interfits a selected upper slot and a lower tab wall connection which includes a spring clip which interfits a selected lower slot aligned with an associated upper slot, the upper and lower slots being arranged in staggered rows to facilitate installation in a vertical orientation of the retainer.

9 Claims, 6 Drawing Sheets

SPRING CLIP RETAINER FOR VENDING MACHINE STORAGE COMPARTMENTS

BACKGROUND OF THE INVENTION:

This invention relates generally to a retainer system for vending machine compartments and in particular to a retainers, which include aligned upper and lower connections to the wall to which they are attached, and ensures that the retainers are properly installed in a vertical orientation, and particularly to a retainer having a lower connection tab, which includes a spring clip to facilitate installation.

When vending machines of the type under consideration were first introduced they were intended primarily to vend soft drink products in 12 ounce aluminum cans. Such cans have a very stable geometry and rarely created a vend reliability problem.

With the advent of larger size plastic containers into the market place, for example 20 ounce bottles, problems were presented which were not encountered with metal cans. Originally, the bottles were vended in double-depth columns, one in the front and one in the rear. The retainer system used for this arrangement in the rear columns was in the form of a spring finger which was adequate for single and double-depth bottles. However, with the advent of the triple-depth columns with two columns at the rear, there was a need for a new retainer system since the old system was inadequate, unreliable, and unsuitable for triple-depth bottles.

The triple-depth vendor poses unique problems because of the double-depth bottles in the two rear columns. This arrangement introduces a vend reliability problem and also a visibility problem to the operator loading the vending machine because of the greater depth the rearmost columns required for the operator to reach. The original system does not work well for triple-depth bottles and results in vending problems such as the tendency for the bottles to "nose dive" which eventually causes jams. This was one problem which had to be overcome. Another problem which had to be overcome was the placement of the retainer in correct vertical orientation. The old system provided upper and lower rows of slots which were hooked into by upper and lower hooks on the retainers, which are of considerable length, up to four feet long, which made it difficult to fit the upper and lower hooks into vertically aligned slots, particularly in view of the up and down motion required for installing hooks into both sets of slots. If the retainer is not in the correct vertically aligned slot then the compartment depth is different at the top and the bottom which can also cause the containers to nose dive and jam. Thus, there is a need, particularly in triple-depth compartment vending machines for a bottle separation retainer system which can be installed with ease and accuracy and increased vend reliability.

This retainer system solves these problems in a manner not revealed in the known prior art.

SUMMARY OF THE INVENTION

This spring clip retainer system provides a retainer having upper and lower connections to a vending machine compartment wall. The upper connection is in the form of a hook which engages one of a row of upper slots and the lower connection is in the form of a tab having a spring clip which interfits one of a row of lower slots, such that the upper hook is first hooked into position and when the retainer is swung into position, the tab with the spring clip can be easily pushed directly into place in an aligned lower slot.

Both the upper and lower rows of slots are disposed in staggered sets which facilitates the selection of the correct slot rather than one on either side of the correct one. Thus, because of this staggered slot arrangement and because of the equal vertical spacing of aligned upper and lower slots, is virtually impossible to misalign the upper and lower retainer connections.

This invention provides a retainer system for a vending machine storage compartment for containers, the retainer system comprising: a compartment wall having an upper connection means and a lower connection means, an elongate retainer having an upper connection means engageable with the upper connection means of the wall and a lower connection means engageable with the lower connection means of the wall for removably connecting the retainer to the compartment wall in selectively adjustable relation lengthwise of the wall; and the lower connection means of the wall and the lower connection means of the retainer cooperating to hold the lower connection means together resiliently against removal in a direction substantially perpendicular to the wall.

It is an aspect of this invention to provide that the upper connection means of the wall includes at least one slot and the lower connection means includes at least one slot; the upper connection means of the retainer includes a hook means received by an upper slot of the wall means; the lower connection means of the retainer includes a tab receivable by a lower slot of the wall means by pushing the tab inwardly into the slot; and holding means between the tab and the slot for resiliently holding the tab in place, the tab being releasable by pulling the tab outwardly with sufficient force to overcome the holding means.

It is another aspect of the invention to provide that the holding means includes spring means attached to the tab.

It is yet another aspect of the invention to provide that the spring means includes a generally U-shaped spring clip overfitting the tab and having a configuration which is compressible to be receivable within the slot when the tab is pushed into the slot and expandable to be retained within the slot until sufficient force is applied to the tab to depress the spring clip to permit withdrawal of the tab from the slot.

It is still another aspect of the invention to provide that the compartment wall upper connection means includes a slot; the compartment wall lower connection means includes a slot; the retainer upper connection means includes a hook received by the slot; and the retainer lower connection means include a resilient tab receivable by said slot in retained relation.

It is another aspect of the invention to provide that the compartment wall upper connection means includes a plurality of longitudinally staggered slots; the compartment wall lower connection means includes a plurality of longitudinally staggered slots aligned with the slots of the upper connection means; associated upper and lower aligned slots being spaced apart the same longitudinal distance; the retainer upper connection means includes a hook receivable by a wall upper connection slot; and the lower connection means includes a tab, the hook and the tab being longitudinally spaced apart to facilitate entry of the tab into its associated slot.

It is yet another aspect of the invention to provide that the clip includes front and rear interconnected portions overfitting the tab, one of said front and rear portions including a flanged end; and the tab includes a slot receiving the clip flange in retained relation.

This retainer system is relatively inexpensive to manufacture, simple to install and adjust and is very effective for its intended purpose.

DESCRIPTION OF THE PREFERRED EMBODIMENT

Figure 1:
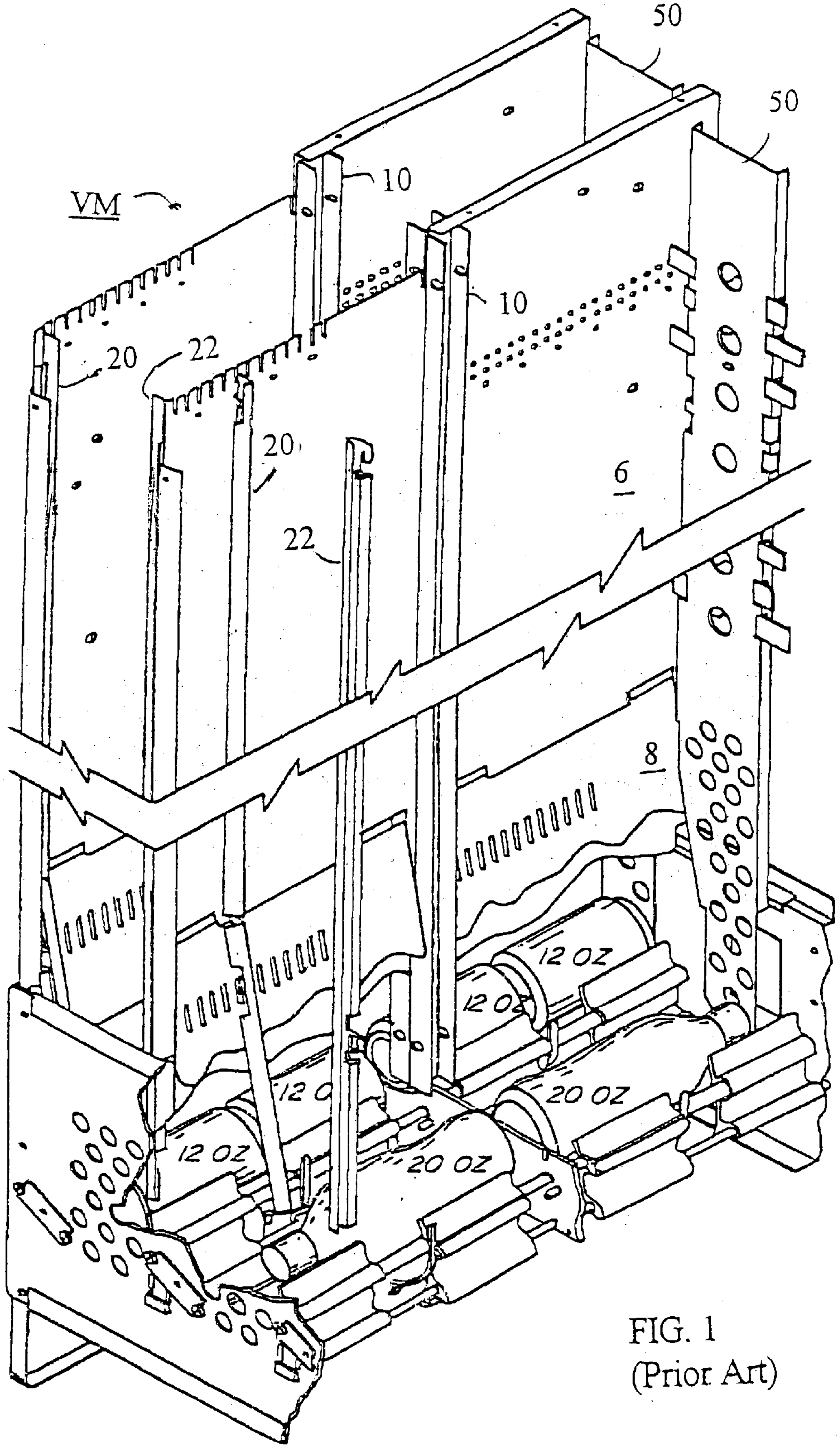
FIG. 1 (Prior Art)
FIG. 1 is perspective view of a prior art double-depth vending machine compartment.

Referring now by reference numerals to the drawings and first to FIG. 1, it will be understood that the front and rear compartments 2*a*, 2*b*; shown are parts of a prior art vending machine VM. The two compartments are provided with retainer members 20 and 22, divider members 10 and an end partition 50. Vending machine compartments of this type are shown in commonly owned U.S. Pat. No. 5,529,207, which is incorporated herein by reference.

Figure 2:
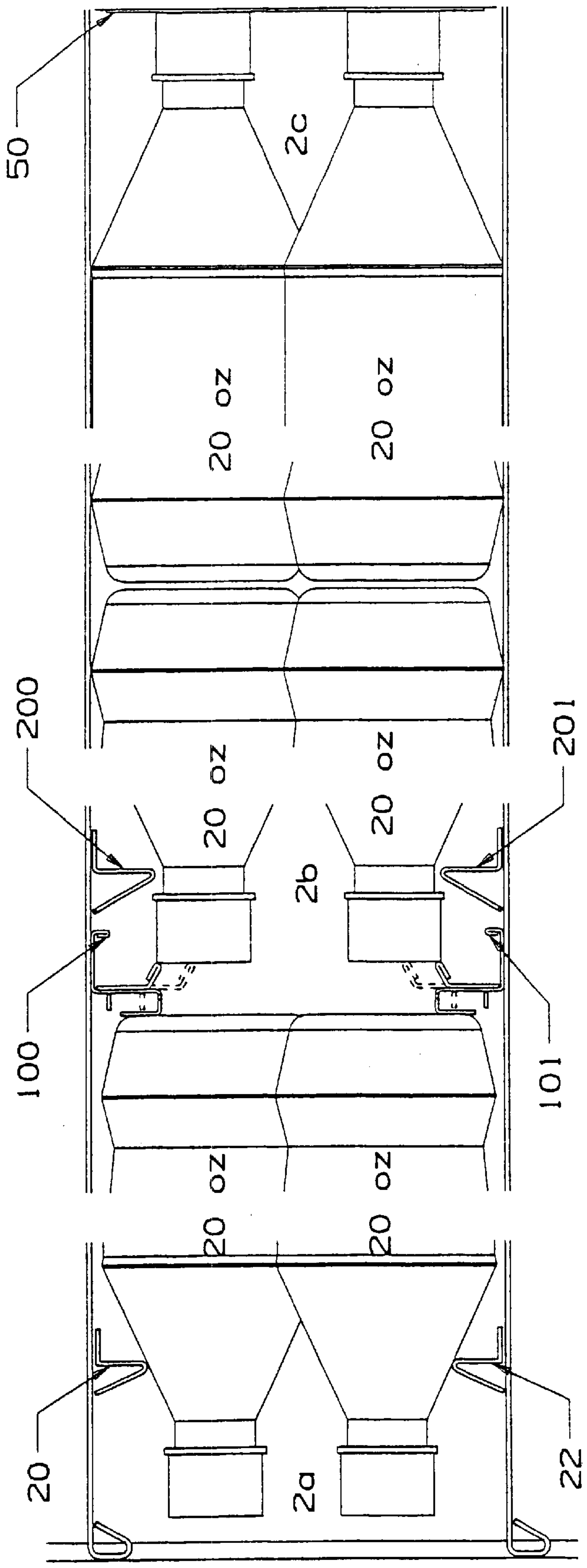
FIG. 2 is a simplified fragmentary view of a triple-depth vending machine compartment showing the retainer in the second section.
Figure 3:
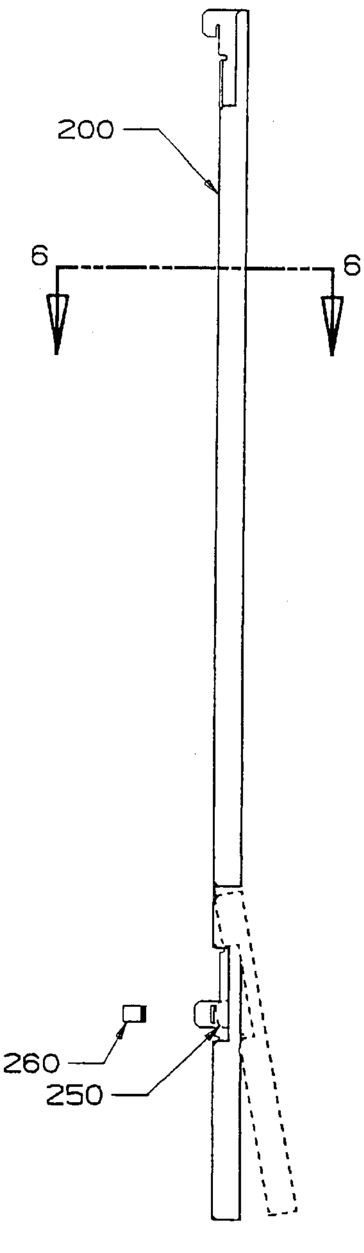
FIG. 3 is a elevational view of the retainer in the second section.

The present triple-depth compartment is shown in simplified form in a plan view FIG. 2 and includes opposed triple-depth compartments each having a divider assembly 100 separating the first and second compartments 2*a* and 2*b*, a retainer 200 disposed in the second and an end partition 50. The retainer 20 is disclosed in U.S. Pat. No. 5,529,207, which is incorporated herein by reference. The divider assembly 100 forms the subject matter of companion application Ser. No. 09/717,405 which is incorporated herein by reference. The end partition 50 is similar to that shown in U.S. Pat. No. 5,529,207.

In the preferred embodiment, the retainers 200 and 201 are identical except for being formed in mirror image of each other. Both are initially straight with a notch which provides a bend point. Retainer 201 prior to installation is bent about the bend point to conform to the configuration of compartment walls 6 and 8 to which it is connected. Retainer 201 remains straight to conform to wall 6.

Figure 6:
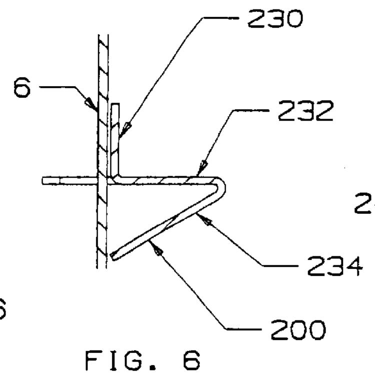
FIG. 6 is across-sectional view taken on Line 6—6 of FIG. 3.
Figure 4:
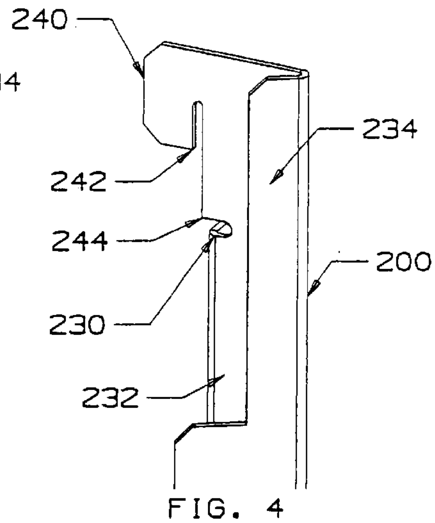
FIG. 4 is an enlarged fragmentary perspective view of the upper end of the retainer of FIG. 3.
Figure 5:
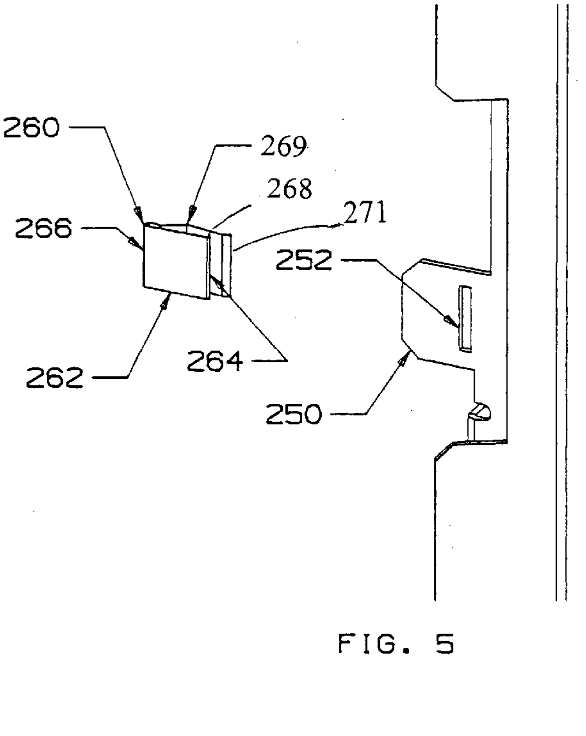
FIG. 5 is an enlarged fragmentary perspective view of the lower end of the retainer of FIG. 3 showing the spring clip tab prior to installation of the spring clip.
Figure 12:
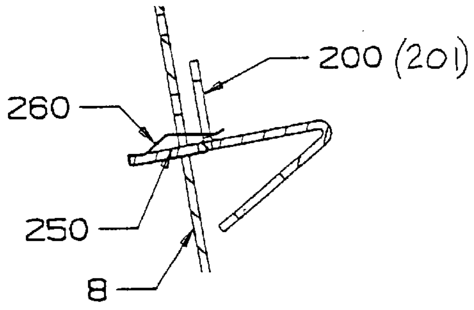
FIG. 12 is a cross-sectional view taken on Line 12—12 of FIG. 10.

Referring now to FIGS. 2–8, it will be understood that the retainer 200 is formed from a single sheet of material, preferably of metal such as steel. The sheet provides, as best shown in FIG. 6, a flange 230 parallel to the plane of the wall 6, an intermediate portion 232 and an inclined flange 234. At its upper end, the flange 230 is outwardly bent to provide a hook portion 240 above a horizontal notch 244, the hook portion being defined by a vertical notch 242. At its lower end, the flange 230 is outwardly bent to provide a tab 250 which includes a vertical slot 252. The tab 250 is fitted with a spring clip 260 having a width substantially equal to the length of the slot 252 and constituting a resilient holding means. The spring clip 260 includes a generally flat portion 262, having a reentrantly formed inner end 264, an outer end 266, a V-shaped portion 268 defined by a ridge 269, and a lip 271. The spring clip 260 is pushed onto the tab 250 until the inner end is received in engaged relation by the slot 252. The installed clip 260 is shown in FIG. 9 and FIG. 12.

Figure 7:
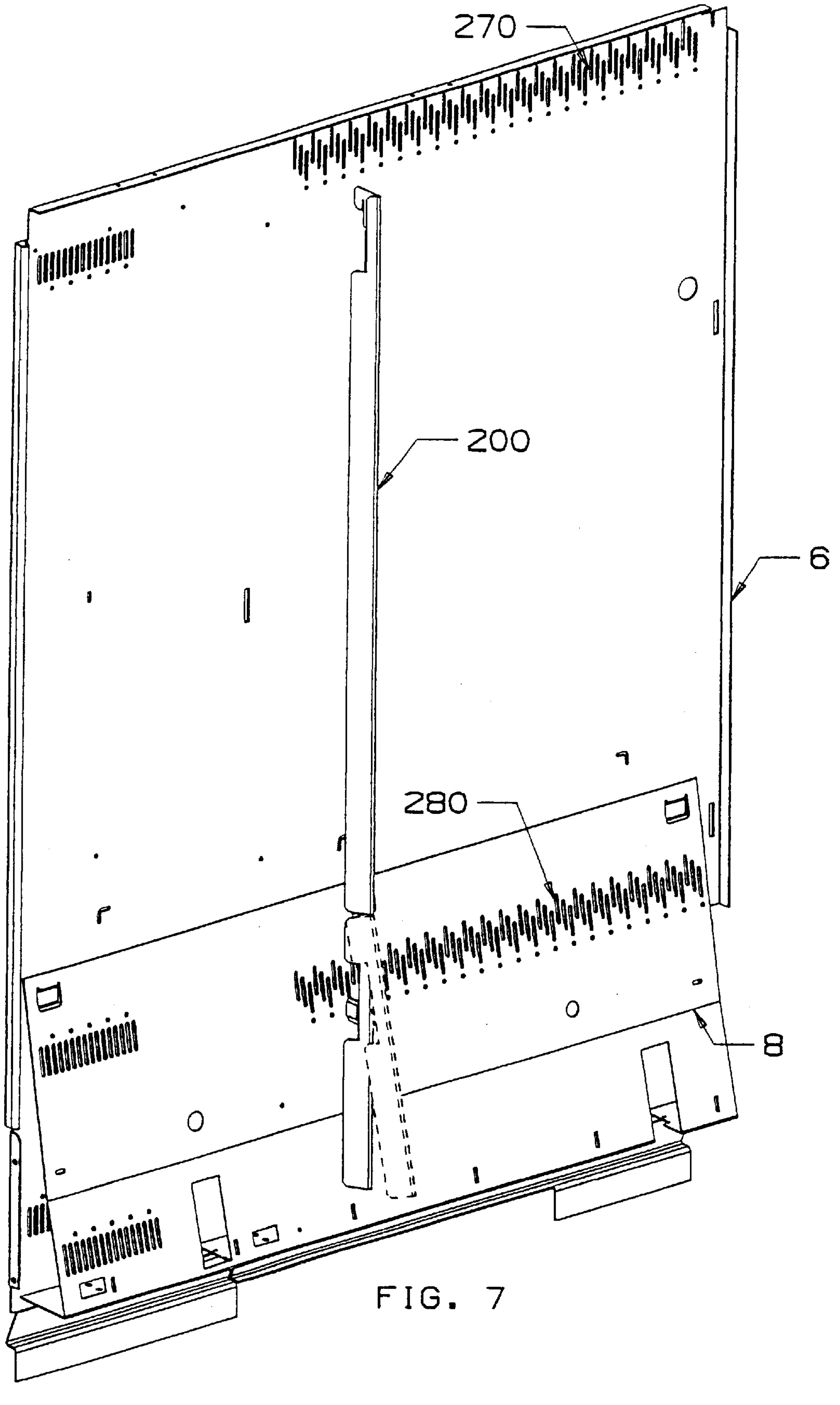
FIG. 7 is a perspective view of the retainer and compartment wall showing the retainer in an incipient installation position.
Figure 8:
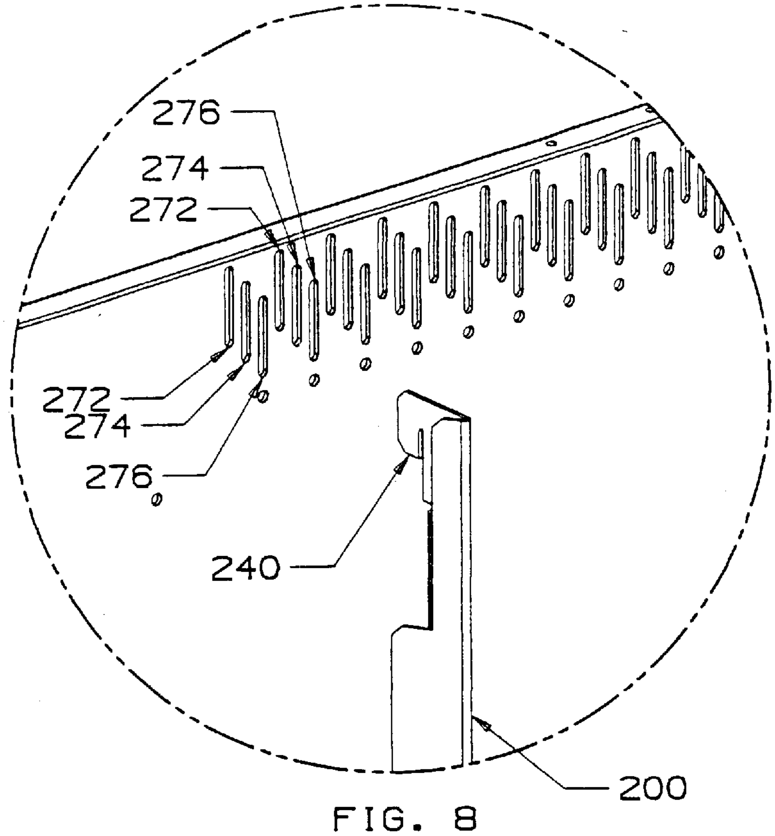
FIG. 8 is an enlarged fragmentary detail showing the upper end of the retainer prior to installation.
Figure 9:
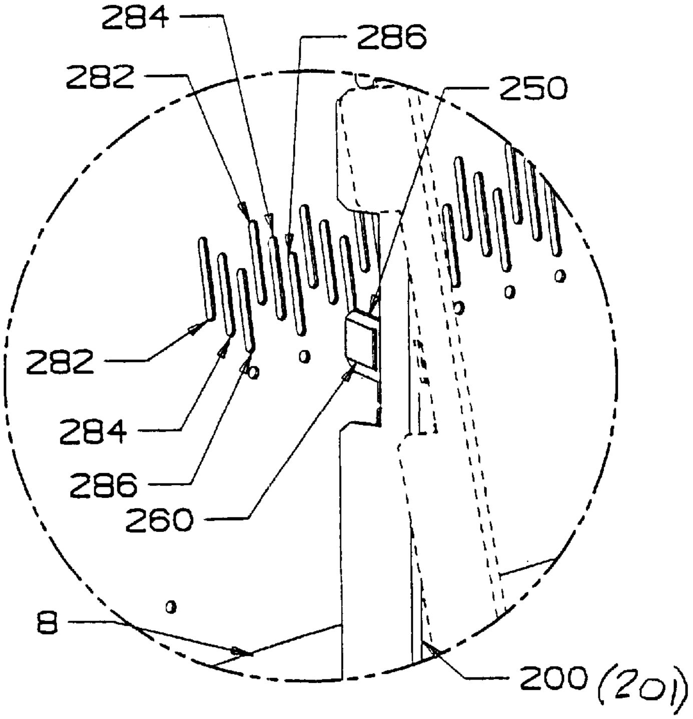
FIG. 9 is an enlarged fragmentary detail showing the lower end of the lower end of the retainer showing clip tab prior to installation.
Figure 10:
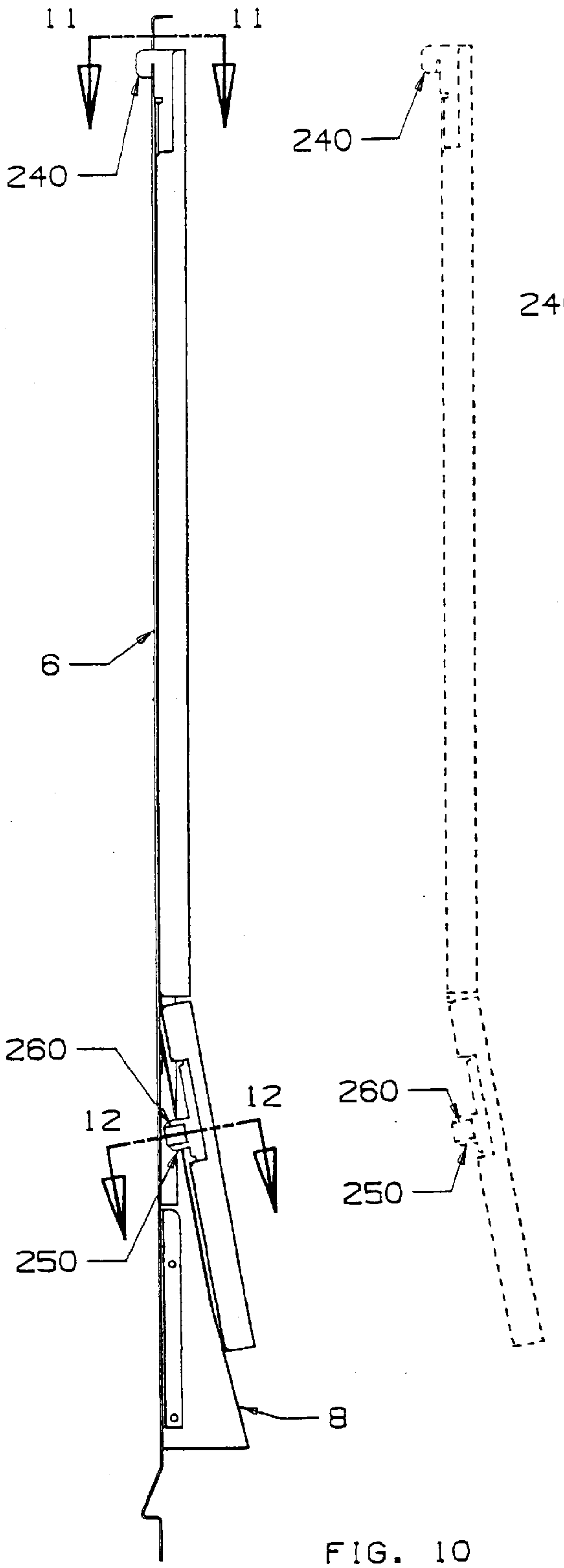
FIG. 10 is a fragmentary longitudinal sectional view of the wall showing the retainer following installation.
Figure 11:
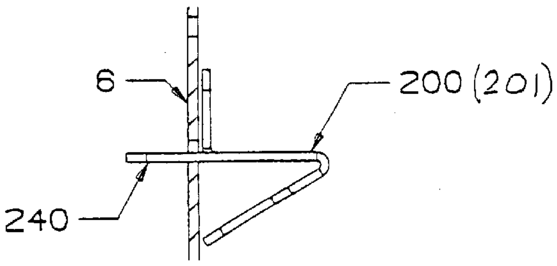
FIG. 11 is a cross-sectional view of the upper end of the retainer taken on Line 11—11 of FIG. 10.

As shown in FIGS. 7–9, the walls 6 and 8 include upper and lower horizontal rows of slots 270 and 280, respectively. In the embodiment shown, upper row of slots 270 includes a plurality of sets of vertically oriented slots each set consisting of three slots 272, 274 and 276 disposed in staggered relation. Similarly, lower row of slots 280 includes a plurality of sets of vertically oriented slots 282, 284, and 286. Each upper slot 272, 274 and 276 is vertically aligned with an associated lower slot 282, 284 and 286. The advantage of this arrangement is that it ensures that the vertically aligned slots, e.g. slots 272, 282; 274, 284; and 276, 286 are spaced apart a distance corresponding to the distance between the upper hook 240 and the lower tab 260 so that when the hook 240 is installed in, for example, upper slot 272 the tab 260 is received by vertically aligned slot 282 thereby ensuring that the upper portion of retainer 200 is vertically disposed. Because of this, if the retainer hook 240 is received by upper slot 274, the retainer tab 260 must be received by aligned lower slot 284 and cannot be received by adjacent slots 282 or 286.

The tab 250 with the spring clip 260 attached can be installed into an associate slot, such as slot 282, and retained in said slot because the width of the spring clip 260 at the ridge 269 is greater than the width of the slot but is compressed inwardly as it is received into the slot. The compression continues until the ridge 269 is passed, as shown in FIG. 12, at which time spring clip 260 tends to expand to its original width and holds the tab 250 in place. The spring clip 260 must be compressed again to remove the tab 260 from the slot. Thus, the retainer 200 is held in place until sufficient outward force is applied to the tab 250 to compress the resilient spring clip 260 sufficiently to effectuate removal of the retainer 200.

Once resilient tab 260 of the retainer 200 has been removed from the lower slot to which it is connected it and swung outwardly away from said lower slot 284, it is a simple matter to lift the upper connection hook 240 upwardly and outwardly from the upper slot 274 to free the retainer 200 from the wall 6.

Although the invention has been described by making detailed reference to preferred embodiments, such detail is to be understood in an instructive rather than in any restrictive sense, many other variants being possible within the scope of the claims hereunto appended.

We claim:

1. A retainer system for a vending machine storage compartment for containers, the retainer system comprising:

(a) a compartment wall having an upper portion having an upper connection means and a lower portion having a lower connection means, (b) an elongate retainer having an upper connection means engageable with the upper connection means of the wall and a lower connection means engageable with the lower connection means of the wall for removably connecting the retainer to the compartment wall in selectively adjustable relation lengthwise of the wall; and (c) the lower connection means of the wall and the lower connection means of the retainer cooperating to hold the lower connection means together resiliently against removal in a direction substantially perpendicular to the wall.

2. A retainer system as defined in claim 1, wherein:

(d) the compartment wall upper connection means includes an upper slot;

(e) the compartment wall lower connection means includes a lower slot;

(f) the retainer upper connection means includes a hook received by said upper slot; and (g) the retainer lower connection means includes a resilient tab receivable by said lower slot in retained relation.

3. A retainer system as defined in claim 1, in which:

(d) the compartment wall upper connection means includes a plurality of longitudinally staggered upper slots;

(e) the compartment wall lower connection means includes a plurality of longitudinally staggered lower slots aligned with the upper slots of the upper connection means;

(f) associated upper and lower aligned slots being spaced apart the same longitudinal distance;

(g) the retainer upper connection means includes a hook receivable by one of the plurality of wall upper connection slots; and (h) the retainer lower connection means includes a tab, the hook and the tab being longitudinally spaced apart to facilitate entry of the tab into its associated lower slot.

4. A retainer system for a vending machine storage compartment for containers, the retainer system comprising:

(a) a compartment wall having an upper portion having an upper connection means and a lower portion having a lower connection means, (b) an elongate retainer having an upper connection means engageable with the upper connection means of the wall and a lower connection means engageable with the lower connection means of the wall for removably connecting the retainer to the compartment wall in selectively adjustable relation lengthwise of the wall;

(c) the lower connection means of the wall and the lower connection means of the retainer cooperating to hold the lower connection means together resiliently against removal in a direction substantially perpendicular to the wall;

(d) the upper connection means of the wall including at least one upper slot and the lower connection means of the wall including at least one lower slot;

(e) the upper connection means of the retainer including a hook means received by the at least one upper slot;

(f) the lower connection means of the retainer including a tab receivable by the at least one lower slot by pushing the tab inwardly into the at least one lower slot; and (g) holding means between the tab and the slot for holding the tab resiliently in place, the tab being releasable by pulling the tab outwardly with sufficient force to overcome the holding means.

5. A retainer system as defined in claim 4, wherein:

(h) the holding means includes spring means attached to the tab.

6. A retainer system as defined in claim 5, wherein:

(i) the spring means includes a generally U-shaped spring clip overfitting the tab and having a configuration which is compressible to be receivable within the slot when the tab is pushed into the slot and expandable to be retained within the slot until sufficient force is applied to the tab to depress the spring clip to permit withdrawal of the tab from the slot.

7. A retainer system as defined in claim 6, which:

(j) the clip includes front and rear interconnected portions overfitting the tab, one of said front and rear portions including a flanged end; and (k) the tab includes a slot receiving the clip flanged end in retained relation.

8. A retainer system for a vending machine storage compartment for containers, the retainer system comprising:

(a) a compartment wall having an upper portion having upper connection means and a lower portion having lower connection means;

(b) an elongate retainer having an upper connection means engageable with the upper connection means of the wall and a lower connection means engageable with the lower connection means of the wall for removably connecting the retainer to the compartment wall in selectively adjustable relation lengthwise of the wall; and (c) the upper connection means includes a plurality of longitudinally staggered upper slots, and the lower connection means includes a plurality of longitudinally staggered lower slots aligned with the upper slots;

(d) associated upper and lower aligned slots being spaced apart the same longitudinal distance.

9. A retainer system as defined in claim 8, wherein:

(e) the retainer upper connection means includes a hook receivable by one of said plurality of upper connection slots and the retainer lower connection means includes a resilient tab receivable by the associated lower slot of the wall lower connection means; and (f) the longitudinal spacing of associated upper and lower slots is substantially equal to the spacing of the hook and the resilient tab.

* * * * *